United States Patent
Townsend

(10) Patent No.: US 6,263,412 B1
(45) Date of Patent: *Jul. 17, 2001

(54) METHOD AND APPARATUS FOR RAM EMULATION USING A PROCESSOR REGISTER SET

(75) Inventor: Scott Lee Townsend, Mission Viejo, CA (US)

(73) Assignee: Phoenix Technologies Ltd., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,937

(22) Filed: Jun. 24, 1998

(51) Int. Cl.[7] .................................................. G06F 12/00
(52) U.S. Cl. .............................. 711/170; 711/104; 713/1; 714/28
(58) Field of Search ................................... 711/104, 170; 714/100, 28; 713/1, 2

(56) References Cited

U.S. PATENT DOCUMENTS

| | | | |
|---|---|---|---|
| Re. 35,480 | 3/1997 | DeLisle et al. ....................... | 710/14 |
| 4,926,322 | * 5/1990 | Stimac et al. ....................... | 395/500 |
| 5,255,379 | 10/1993 | Melo ..................................... | 711/202 |
| 5,274,834 | 12/1993 | Kardach et al. ..................... | 710/260 |
| 5,276,888 | 1/1994 | Kardach et al. ..................... | 710/261 |
| 5,280,599 | 1/1994 | Arai ..................................... | 711/172 |
| 5,283,889 | 2/1994 | DeLisle et al. ................. | 395/500.44 |
| 5,313,585 | * 5/1994 | Jeffries et al. ....................... | 711/201 |
| 5,530,960 | * 6/1996 | Parks et al. ............................ | 710/5 |
| 5,544,344 | 8/1996 | Frame ................................. | 711/144 |
| 5,638,532 | 6/1997 | Frame et al. ........................ | 711/154 |
| 5,758,124 | * 5/1998 | Ogata et al. ................... | 395/500.48 |

* cited by examiner

*Primary Examiner*—Matthew Kim
*Assistant Examiner*—Matthew D. Anderson

(57) ABSTRACT

An apparatus and method for accessing a writeable storage in a processor-based system. The apparatus comprises at least one writeable storage element and memory for storing instruction sequences by which the processor-based system is processed, that has a writeable storage location. A processor is coupled to the writeable storage element and executes the stored instruction sequences. The stored instruction sequences include process steps to cause the processor to: (a) detect an access to the writeable storage location; (b) transfer the access to the writeable storage location to an access to the writeable storage element; (c) process an instruction sequence corresponding to the access to the writeable storage element.

21 Claims, 8 Drawing Sheets

*FIG. 2A*
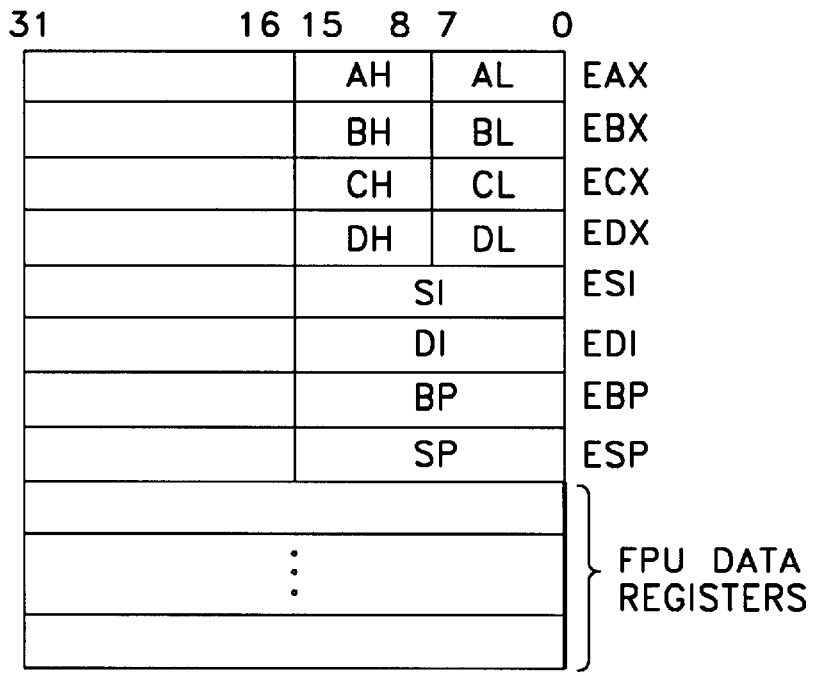
*FIG. 2B*
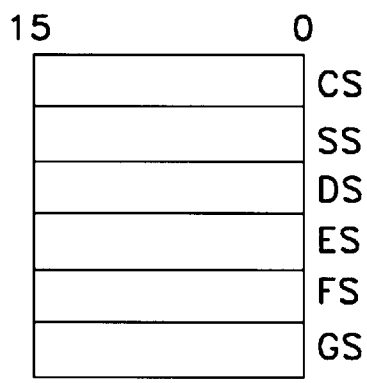
*FIG. 2C*
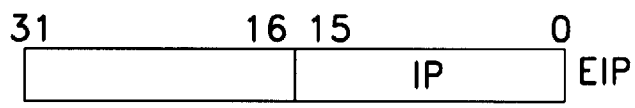

FIG. 2D

SYSTEM ADDRESS REGISTERS

| | 47      32-BIT LINEAR BASE ADDRESS      16 | 15   SIZE   0 |
|---|---|---|
| GDTR | 32-BIT LINEAR BASE ADDRESS | SIZE |
| IDTR | 32-BIT LINEAR BASE ADDRESS | SIZE |

FIG. 2E

| | SYSTEM SEGMENT REGISTERS | DESCRIPTOR REGISTERS | | |
|---|---|---|---|---|
| | 15          0 | | | |
| TR | SELECTOR | 32-BIT LINEAR BASE ADDRESS | 20-BIT SIZE | ATTRIBUTE |
| LDTR | SELECTOR | 32-BIT LINEAR BASE ADDRESS | 20-BIT SIZE | ATTRIBUTE |

FIG. 2F

| | 31 | | 0 |
|---|---|---|---|
| CR0 | PG | | MSW |
| CR1 | RESERVED | | |
| CR2 | PAGE FAULT LINEAR ADDRESS | | |
| CR3 | PAGE DIRECTORY BASE ADDRESS | | |
| CR4 | | | |

METHOD AND APPARATUS FOR RAM EMULATION USING A PROCESSOR REGISTER SET

BACKGROUND OF THE INVENTION

1. Field of the Invention

The present invention relates generally to memory in processor-based or microcontroller-based systems, and more particularly, to an apparatus and method of emulating random access memory using a processor register set.

2. Description of the Related Art

In processor-based systems, read only memories (ROM) are configured to store information that has been written during the manufacturing process, but which cannot be written to during the normal operating process of the system. Random access memories (RAM) store information that can be directly and randomly read or written. The information stored in ROM is non-volatile (i.e., the information is retained when power is turned off), while that stored in RAM is volatile (i.e., information is lost when power is turned off). Boot routines and the PC BIOS routines are typically stored in ROM because information is retained when power is turned off.

However, information cannot be written to ROM and data that is stored in ROM typically cannot be altered, and when alteration is possible, it is difficult. As a result, an application program such as application software and/or firmware that is executed during power up or before RAM has been initialized and made accessible, has limited applications. This is because it cannot store information in ROM. For example, such application software cannot write e.g., store variables, build lists, or implement deeply nested procedures which utilize high level languages.

Accordingly, there is a need in the technology for an apparatus and method for overcoming the aforementioned problems. In particular, there is a need for an apparatus and method for enabling applications to write to a storage location prior to availability and accessibility of RAM in a processor system.

BRIEF SUMMARY OF THE INVENTION

An apparatus and method for accessing a writeable storage in a processor-based system. The apparatus comprises at least one writeable storage element and memory for storing instruction sequences by which the processor-based system is processed, that has at least one writeable storage location. A processor is coupled to the at least one writeable storage element and executes the stored instruction sequences. The stored instruction sequences include process steps to cause the processor to: (a) detect an access to the at least one writeable storage location; (b) transfer the access to the at least one writeable storage location to an access to the at least one writeable storage element; (c) process an instruction sequence corresponding to the access to the at least one writeable storage element.

BRIEF DESCRIPTION OF THE DRAWINGS

FIGS. 2A–2F illustrate the registers of one embodiment of the processor 12.

DETAILED DESCRIPTION OF THE PREFERRED INVENTION

The present embodiment is described in reference to a processor system 10.

Figure 1:
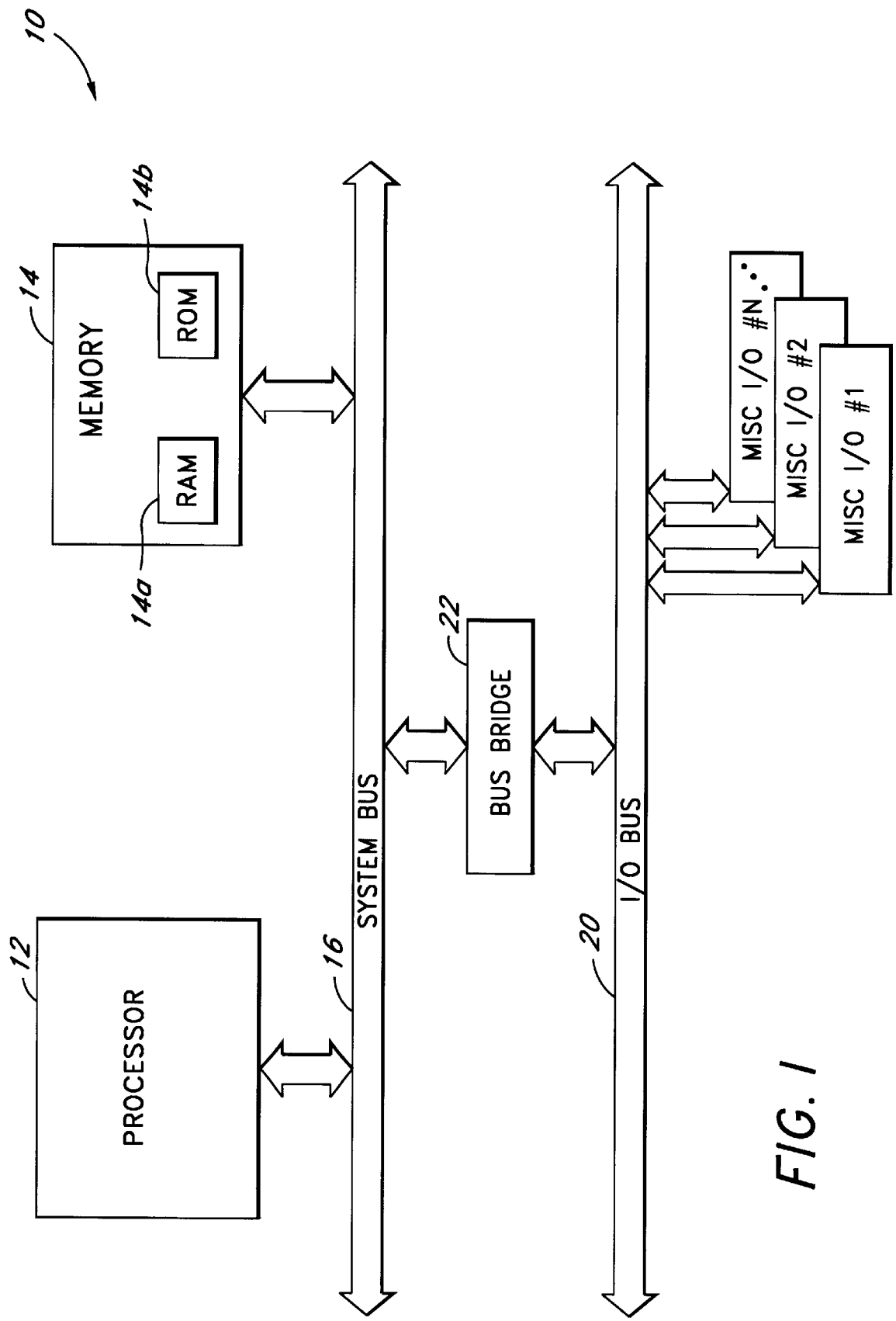
FIG. 1 is a system block diagram of an exemplary processor system in which the apparatus and method of the present invention is used.

FIG. 1 illustrates an exemplary processor system 10 which implements the processes of the present invention. The processor system 10 comprises a processor 12 (such as a central processing unit) and a memory module 14. The memory module 14 includes random access memory (RAM) 14*a* and read-only memory (ROM) 14*b*. In one embodiment, the memory module 14 also includes a main memory or a dynamic random access memory (DRAM). The processor 12 and memory module 14 are coupled to a system bus 16. The processor system 10 may also include various I/O and peripheral modules (MISC I/O #1, #2, . . . #N) which are coupled along an I/O bus 20 that is in turn coupled to the system bus 16 via a bus bridge 22. Examples of the peripheral modules include a console, a printer and a mouse. In one embodiment, the processor 12 includes any one of the x86, Pentium™, Pentium II™ and Pentium Pro™ microprocessors as marketed by Intel Corporation. In an alternate embodiment, the processor 12 may be the K-6 microprocessor as marketed by AMD. In a further embodiment, the processor 12 is the 6×86MX microprocessor as marketed by Cyrix Corp. Further examples include the Alpha processor as marketed by Digital Equipment Corporation, the 680X0 processor as marketed by Motorola; or the Power PC processor as marketed by IBM. It is understood by one of ordinary skill in the technology that the present invention can be implemented in any processor-based system that implements a memory fault detection mechanism and has nondedicated storage elements such as floating point registers.

Although the processor 12 may be implemented using a number of designs as discussed above, for present discussion purposes, the Pentium™ family of Intel processors will be referred to. FIGS. 2A–2F illustrate the registers of the Pentium™ family of processors which are used in the discussion of the present invention. The Pentium™ family of processors each include eight thirty-two bit general registers EAX, EBX, ECX, EDX, ESI, EDI, EBP and ESP. The processor 12 also includes nondedicated registers such as floating point unit (FPU) data registers. The sixteen lower order bits of the AX, BX, CX, DX registers are independently addressable in eight bit increments as the AH (high), AL (low), BH, BL, CH, CL, DH and DL registers for byte addressing. In addition, the processors contain six sixteen bit segment registers which hold segment selectors that index into tables of segment descriptors in memory for determining the addresses of the segments. Two thirty-two bit registers, EFLAGS and EIP (instruction pointer) are used for status and control purposes.

Each processor also includes four registers used for memory management. A global descriptor table register (GDTR) stores the base address at which a global descriptor table may be found in memory; the global descriptor table holds the segment descriptors which provide a base address, a size and protections by which segment addressing is accomplished. A local descriptor table register (LDTR) also stores base addresses at which local descriptor tables may be found in memory; and a local descriptor table holds the segment descriptors by which segment addressing for individual programs is accomplished. A task register (TR) holds information including the address of a task state segment (TSS) descriptor in the global descriptor table which is used to switch between programs. An interrupt descriptor table register (IDTR) holds address and other information pointing to a table from which the addresses for interrupt operations may be determined.

The processors also include four control registers CR0, CR1, CR2 and CR3. The CR0 register holds system control flags which control the modes of operation or indicate states which apply to the processor. The CR0 register also holds various control bits.

Figure 3:
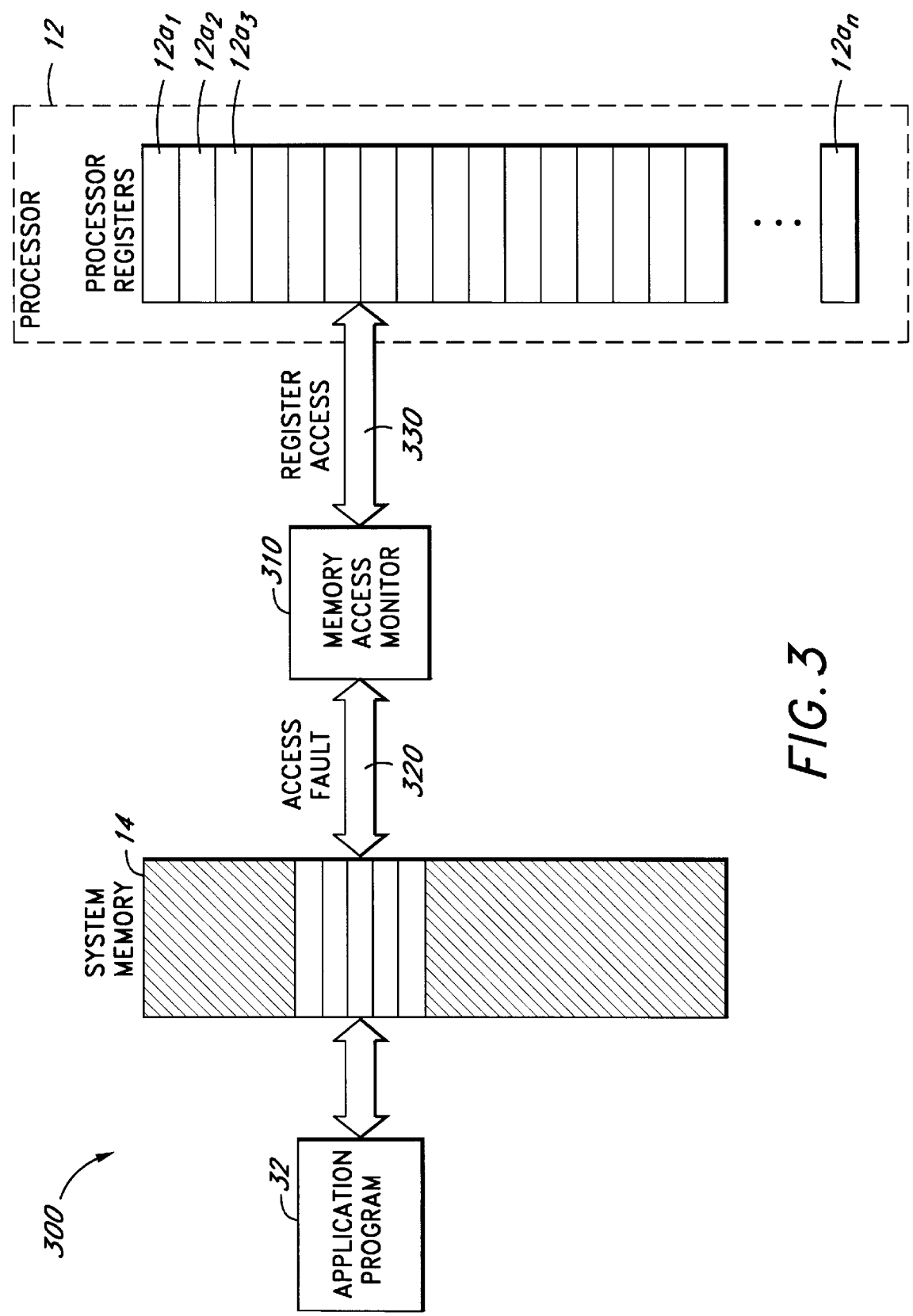
FIG. 3 is a block diagram illustrating the RAM emulation access process 300 in accordance with one embodiment of the present invention.

FIG. 3 illustrates one embodiment of the RAM emulation access technique 300 of the present invention. The present invention provides a memory access monitor (MAM) 310 which monitors attempts to access RAM 14a (FIG. 1) by an application program (that may be stored in memory 14 or be provided via any of the peripheral modules (MISC I/O #1, #2, . . . #N)) and transfers such an attempted access to an access to one or more of the processor registers $12a_1$–$12a_n$ located in the processor 12, thereby providing an emulated RAM to application programs which require the use of RAM. The memory access monitor 310 may be implemented as software, firmware or hardware. In one embodiment, the processor registers $12a_1$–$12a_n$ are non-dedicated processor registers such as floating point unit data registers (see FIG. 2A) Although one embodiment of the present invention refers to the use of processor registers $12a_1$–$12a_n$ for storing the emulated RAM contents, in alternate embodiments, storage locations outside the processor's 12 memory space may be used to store the emulated RAM contents.

The RAM emulation access technique comprises two subprocesses: an initialization process 400 and an execution process 500, as described in detail in FIGS. 4–7 and in the following sections. During initialization, the RAM emulation access initialization process 400 first allocates space in system memory 14 FIG. 1) for the emulated RAM, which would subsequently be used by the application program during the execution process 500. The initialization process 400 next configures the memory access monitor 310 so that the memory access monitor 310 would gain control when access faults 320 (FIG. 3) to the emulated RAM area occur. The initialization process 400 allocates processor registers that will be used to store the contents of the emulated RAM. Control is the transferred back to the application program. The initialization process 400 then terminates.

Once initialized, application programs may access the emulated RAM. Such access typically occurs during the power-up process, prior to initialization and thus, the accessibility of RAM 14a. When such an access (either to RAM 14a or the emulated RAM) occurs and is detected by processor 12, it generates an access fault signal 320 (FIG. 3), which is detected by the memory access monitor 310. In response, the memory access monitor 310 generates a register access signal 330. The memory access monitor 310 then either reads from or writes to the processor register corresponding to the emulated RAM address that the application program attempted to access. Upon completion of this task, program control is returned to the application program. The execution process 500 then terminates.

Figure 4:
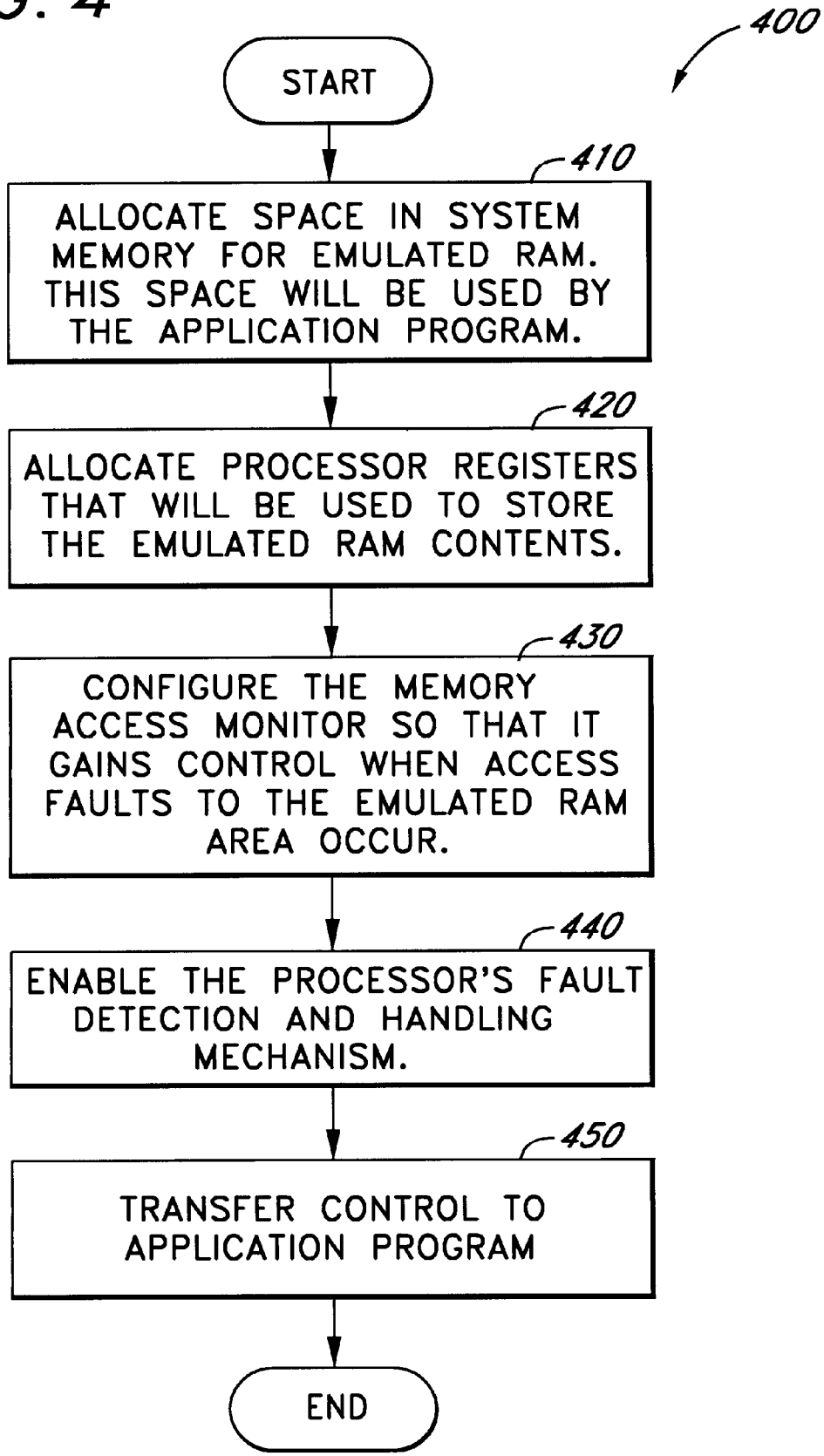
FIG. 4 is a flowchart illustrating one embodiment of the initialization process 400 of the present invention.

FIG. 4 is a flowchart illustrating one embodiment of the initialization process 400 of the present invention. Proceeding from a start state, the initialization process 400 advances to process block 410, where the processor 12 allocates space in system memory 14 for an application program to use as emulated RAM. The process 400 next proceeds to process block 420 where the processor 12 allocates processor registers that will be used to store the emulated RAM contents. The process 400 then advances to process block 430 where the processor 12 configures the memory access monitor 310 (FIG. 3) to enable it to gain control when access faults to the emulated RAM area occur. Next, the processor's fault detection and handling mechanism is enabled, as shown in process block 440. The process 400 then transfers control to the application program, as shown in process block 450. The initialization process 400 then terminates.

Figure 5:
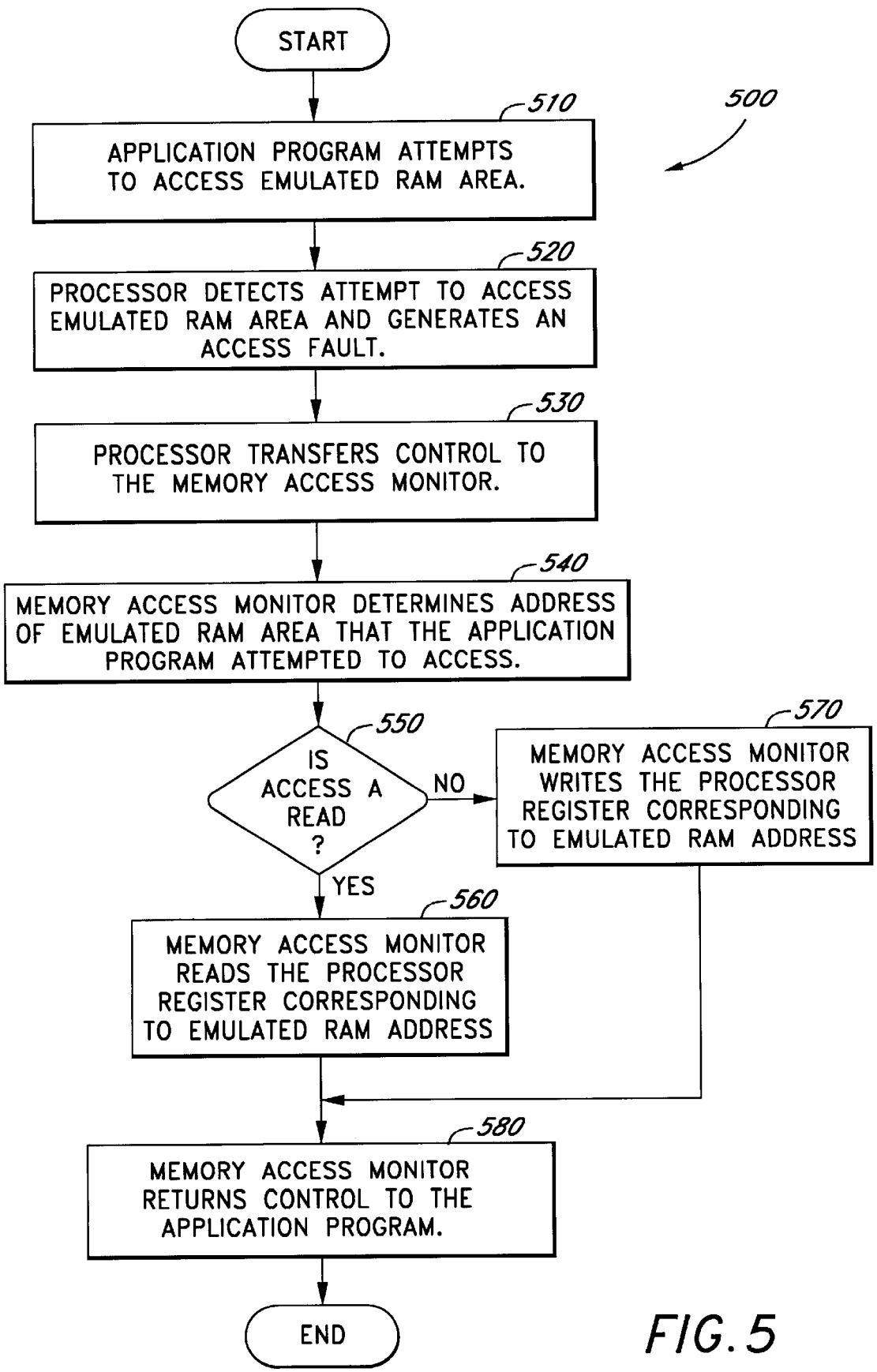
FIG. 5 is a flowchart illustrating one embodiment of the execution process 500 of the present invention.

FIG. 5 is a flowchart illustrating one embodiment of the execution process 500 of the present invention. The execution process 500 begins from a start state and proceeds to process block 510, where the application program attempts to access the emulated RAM area in system memory 14. The processor 12 detects the attempt to access the emulated RAM area and generates an access fault, as shown in process block 520. The processor 12 then transfers control to the memory access monitor 310 (FIG. 3), as shown in process block 530. Upon receipt of the access fault and program control, the memory access monitor 310 determines the address of the emulated RAM area that the application program is attempting to access, as shown in process block 540.

The process 500 then advances to decision block 550, where the processor 12 determines if the attempted access is a READ operation. If so, the process 500 proceeds to process block 560, where the memory access monitor 310 proceeds to read the processor register corresponding to the emulated RAM address. During the READ operation, the contents of the processor register corresponding to the emulated RAM address will be transferred to a predetermined storage location. If the access is not a READ, the operation would be a WRITE operation, and the process 500 proceeds to process block 570, where the memory access monitor 310 proceeds to write to the processor register corresponding to the emulated RAM address. During the WRITE operation, the contents of a predetermined storage location will be transferred to the processor register corresponding to the emulated RAM address. In either case (i.e. if the process 500 proceeds from either block 560 or 570), the process 500 subsequently proceeds to process block 580, where the memory access monitor 310 returns control to the application program. The execution process 500 then terminates.

Figure 6:
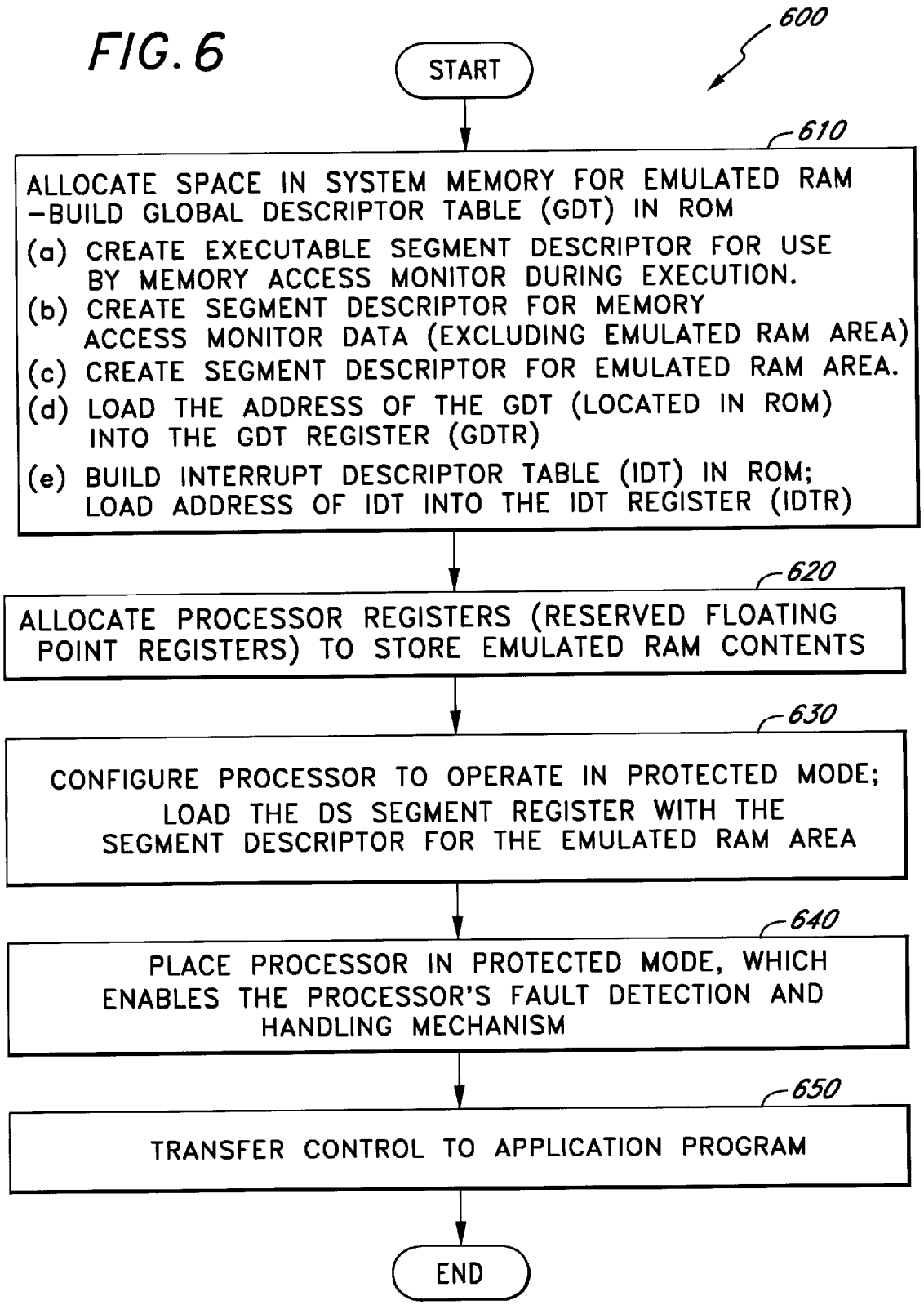
FIG. 6 is a flowchart illustrating one example of the initialization process 600 of the present invention.

An example of implementing the RAM emulation process 600 of the present invention on an Intel Pentium™ processor will now be described. The example includes an initialization process 600 and an execution process 700. FIG. 6 is a flowchart illustrating one example of the initialization process 600 of the present invention. Proceeding from a start state, the initialization process 600 advances to process block 610, where the processor 12 allocates space in system memory 14 for an application program to use as emulated RAM. This is accomplished by first building the global descriptor table (GDT) in ROM. In particular, the process 610 creates an executable segment descriptor for use by the memory access monitor 310 during the execution process; by creating a data segment descriptor for the memory access monitor data (excluding the emulated RAM area); and by creating a segment descriptor for the emulated RAM area. The data segment in the descriptors are then stored in ROM during the ROM programming process. The process 600 also loads the GDT's address in the GDT register (GDTR), and builds the interrupt description table (IDT) located in ROM and loads the address of the IDT into the IDT register (IDTR).

The process 600 then proceeds to process block 620 where it allocates processor registers for use by the emulated RAM by reserving the processor's 12 floating point unit data registers to store the emulated RAM contents. Next, the process 600 proceeds to process block 630 where it configures the processor to operate in the protected mode. It also loads the data segment (DS) register with the segment descriptor for the emulated RAM area. The process 600 next proceeds to process block 640 where it places the processor 12 in protected mode, which enables the processor's 12 fault detection and handling mechanism. Next, the process 600 advances to process block 650, where it transfers control to the application program. The process 600 then terminates.

Figure 7:
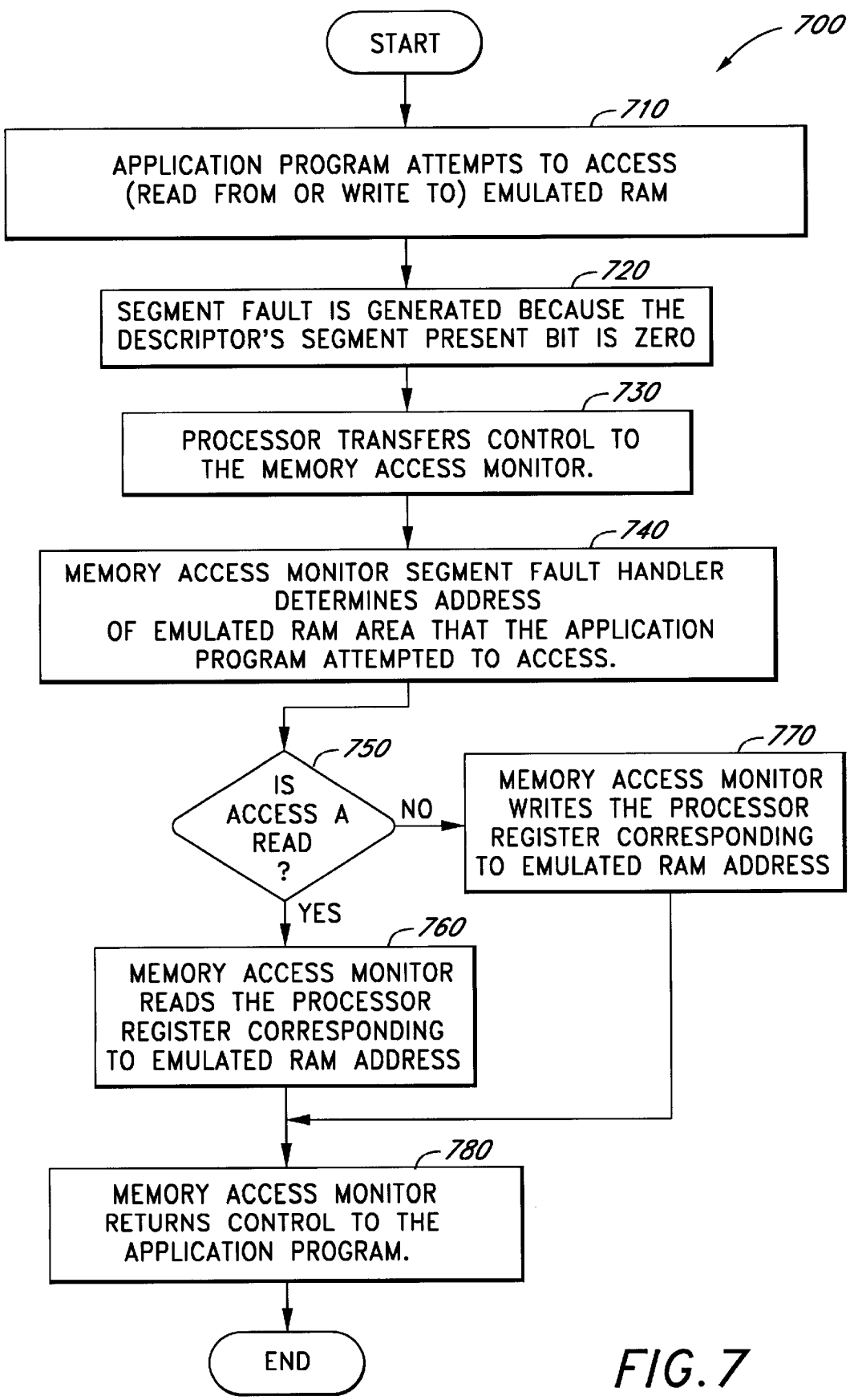
FIG. 7 is a flowchart illustrating one example of the execution process 700 of the present invention.

FIG. 7 is a flowchart illustrating one example of the execution process 700 of the present invention. The execution process 700 begins from a start state and proceeds to process block 710, where the application program attempts to access the emulated RAM area in system memory 14 by attempting to read to or write from the emulated RAM area. The process 700 then advances to process block 720, where the processor 12 examines the descriptor's segment present bit (which was set to 0, indicating that the segment is not in memory). This indicates that there is an attempt to access the emulated RAM area. The process 700 then generates an access fault (or a segment fault), as shown in process block 720. The processor 12 then transfers control to the memory access monitor 310 (FIG. 3), as shown in process block 730. Upon receipt of the access fault and program control, the memory access monitor's 310 segment fault handler evaluates the faulting instruction. In particular, the memory access monitor's 310 fault handler determines the address of the emulated RAM area that the application program is attempting to address, as shown in process block 740.

Next, the memory access monitor's segment fault handler determines if the attempted access is a READ operation (decision block 750). If so, the process 700 proceeds to process block 760, where the memory access monitor 310 proceeds to read the processor register corresponding to the emulated RAM address. If the access is not a READ, the operation would be a WRITE operation, and the process 700 proceeds to process block 770, where the memory access monitor 310 proceeds to write to the processor register corresponding to the emulated RAM address. In either case, the process 700 subsequently proceeds to process block 780, where the memory access monitor 310 returns control to the application program. Control resumes with the instruction that immediately follows the faulting instruction. As a result, the faulting instruction is effectively skipped over. The execution process 700 then terminates.

Through the use of the present invention, an apparatus and method for enabling application programs to write to a storage location prior to the availability and accessibility of RAM in a processor-based system is provided or established. In particular, the present invention facilitates the execution of code that implements memory write instructions prior to the availability and accessibility of RAM by transferring an access to RAM to an access to the processor register(s). As a result, greater programming flexibility is provided.

Although the present invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. An apparatus in a processor-based system for redirecting accesses to a volatile memory, initiated by an application program stored in non-volatile memory, to internal registers of a processor prior to initialization of the volatile memory, comprising:

a non-volatile memory for storing one or more instructions; and a processor including one or more internal registers, the processor, in response to the one or more instructions, to allocate one or more memory locations in the volatile memory;

detect an access from the application program to at least one memory location of the volatile memory;

redirect the access to the at least one internal register; and process an instruction sequence corresponding to the access to the at least one internal register.

2. The apparatus of claim 1, wherein the volatile memory comprises a random access memory.

3. The apparatus of claim 1, wherein the one or more internal registers comprise one or more internal floating-point registers.

4. The apparatus of claim 1, wherein the processor to further configure itself in protected mode; and generate an access fault in response to detecting the access to the at least one memory location of the volatile memory.

5. The apparatus of claim 4, wherein the processor to:

store in a fault handler register, an address to the one or more instructions for processing access faults.

6. The apparatus of claim 1 wherein the non-volatile memory includes a global descriptor table to allocate the one or more memory locations of the volatile memory as emulated memory.

7. The apparatus of claim 1, wherein the non-volatile memory comprises one or both of a read-only memory and a flash memory.

8. The apparatus of claim 1, wherein the access comprises one of read access and a write access.

9. In a system including a processor, a non-volatile memory and a volatile memory, a method for redirecting accesses to a volatile memory, initiated by an application program stored in non-volatile memory, to internal registers of a processor prior to initialization of the volatile memory, comprising:

detecting an access from the application program to a memory location in the volatile memory;

redirecting the access from the memory location to a register internal to the processor; and processing an instruction sequence corresponding to the access to the register.

10. The method of claim 9, wherein detecting the access to the memory location in the volatile memory comprises detecting the access to the memory location in a random access memory.

11. The method of claim 9, wherein redirecting comprises redirecting the access from the memory location to a floating-point register internal to the processor.

12. The method of claim 9, wherein redirecting comprises:

generating an access fault in response to the access to the memory location;

transferring the access from the memory location to the register internal to the processor.

13. The method of claim 12, wherein prior to detecting the access, the method further comprises:
allocating space for the volatile memory; and
allocating the register internal to the processor corresponding to the memory location.

14. The method of claim 13, wherein prior to detecting the access to the memory location, the method further comprises:
storing in a fault handler register located in the processor, an address of one or more instructions for redirecting the access from the memory location to the register internal to the processor.

15. A computer program product, comprising:
a computer usable medium having computer readable program code embodied therein to allocate one or more memory locations in volatile memory;
computer readable program code to redirect accesses to the one or more memory locations in volatile memory to one or more corresponding internal registers of a processor for providing read/write storage for a program prior to initialization of the volatile memory; and
computer readable program code to enable the processor's fault detection mechanism.

16. The computer program product of claim 15 further comprising computer readable program code to attempt an access to a memory location in volatile memory.

17. The computer program product of claim 16 further comprising computer readable program code to redirect the access from the memory location to a register internal to the processor.

18. The computer program product of claim 15 wherein said computer readable program code to store in the register comprises computer readable program code to store in the internal to the processor the address of one or more instructions in non-volatile memory for causing accesses to the one or more memory locations to be redirected to one or more corresponding floating-point registers internal to the processor.

19. The computer program product of claim 15 further comprising computer readable program code to allocate the corresponding one or more registers internal to the processor.

20. The computer program product of claim 15 wherein said computer readable program code to store in the register comprises computer readable program code to store in the register internal to the processor the address of one or more instructions in non-volatile memory for causing read and write accesses to the one or more memory locations to be redirected to the one or more corresponding registers internal to the processor.

21. The computer program product of claim 15 wherein said computer readable program code to allocate one or more memory locations in volatile memory comprises computer readable program code to allocate one or more memory locations in random access memory.

* * * * *